United States Patent [19]

Mott et al.

[11] Patent Number: 4,817,962
[45] Date of Patent: Apr. 4, 1989

[54] UNIVERSAL TUBULAR CONNECTION HAVING A VARIABLE METAL-TO-METAL SEAL WIDTH CORRESPONDING TO MATERIAL YIELD STRENGTH

[75] Inventors: Keith C. Mott, Houston; Gary E. Kirsch, Tomball; H. Paul Barringer, Humble; Lawrence Y. Tung, Houston, all of Tex.

[73] Assignee: The Hydril Company, Houston, Tex.

[21] Appl. No.: 138,667

[22] Filed: Dec. 28, 1987

[51] Int. Cl.[4] .................. F16J 15/08; F16L 15/00
[52] U.S. Cl. ..................................... 277/1; 277/236; 285/334.4
[58] Field of Search .............. 277/1, 235 R, 236, 237; 285/328, 333, 334, 334.4, 355, 390

[56] References Cited

U.S. PATENT DOCUMENTS

| | | | |
|---|---|---|---|
| Re. 6,067 | 9/1874 | Lighthall | 277/236 |
| 2,893,759 | 7/1959 | Blose | 285/334 |
| 2,992,019 | 7/1961 | MacArthur | 285/334 X |
| 3,007,721 | 11/1961 | Schmohl et al. | 277/236 X |
| 3,224,799 | 12/1965 | Blose et al. | 285/334 X |
| 3,353,850 | 11/1967 | Butz et al. | 285/334.4 X |
| 3,468,566 | 9/1969 | Nietzel | 277/236 X |
| 3,567,258 | 3/1971 | Scaramucci | 277/236 X |
| 4,349,203 | 9/1982 | Schulke | 277/236 X |
| 4,623,173 | 11/1986 | Handa et al. | 285/334 X |

OTHER PUBLICATIONS

*Machine Data Handbook*, 3rd Edition, vol. 2, Machinability Data Center, copyright 1980, pp. 18-3 through 18-19.

*Primary Examiner*—Robert S. Ward
*Attorney, Agent, or Firm*—Vaden, Eickenroht, Thompson & Boulware

[57] ABSTRACT

The same size and weight of tubular products, but in different grades of material, are made for universal connection but with seal areas that differ appropriately for adequate sealing without overstressing the connection members for the pressures encountered where each tubular length is put in service. The angle of the conically tapered seal on all box members is made the same for all grades of the products. The pin member of medium grade is made with an equal length seal area and adjacent contracting area on its forward end. The pin member of lower grade is made with a shorter length seal area than its adjacent contacting area, thereby also placing the seal area further from the pin member distal end. This stiffens the pin member. The pin member of higher grade is made with a longer length seal area than its adjacent contacting area.

7 Claims, 2 Drawing Sheets

UNIVERSAL TUBULAR CONNECTION HAVING A VARIABLE METAL-TO-METAL SEAL WIDTH CORRESPONDING TO MATERIAL YIELD STRENGTH

BACKGROUND OF THE INVENTION

This invention pertains to tubular connections and particularly to high quality and high grade connections known as premium connections that are interchangeable independent of material yield strength of the connecting members, but which vary in seal width dependent on yield strength.

DESCRIPTION OF THE PRIOR ART

Tubular products, such as tubings and casings, made of high grade materials and operating under high pressure conditions, such as exist in deep hole applications, are subjected to high bearing stresses on both members of their connections and also correspondingly high hoop compression stresses on the pin members of their connections. Each connection includes at least one metal-to-metal conical sealing surface between its box member and its pin member, usually located on the forward end of the pin member just ahead of the thread set, or the most forward thread set when the connection includes two or more different diameter thread sets.

The surfaces where sealing occurs have to be generally smooth, normally less than 63 $R_a$ (when burnished from assembly stresses) in circular texture or finish, since a rougher texture than this will tend to leak gases under the very high pressures that exist. Therefore, it has been discovered previously that it is highly desirable to provide an appropriate landing or contacting surface ahead of the sealing surface so that the risk of galling the sealing surface is greatly reduced. Not only is the initial contact of the box member and pin member absorbed by such non-sealing surfaces when the two members are brought together as the connection is made up, but it is possible to treat this surface by rough texturing, angling and the inclusion of lubricating compounds so that as the connection is made up the sealing surfaces are lubricated, thereby enhancing the sealing and reducing the propensity of the members to damage at their sealing surfaces. This technique is disclosed in co-pending U.S. patent application Ser. No. 937,690, U.S. Pat. No. 4,736,967, commonly assigned. In operation of making such a connection the box and pin members are brought together such that the sealing surface of the box member first lands on the slightly more steep (than the pin member sealing surface) landing surface of the pin member and then as the connection is made tight, the lubricating compounds are squeezed from the landing surface to the sealing surface. At the same time, the box member is slightly expanded and the pin member is slightly compressed. Thus, when fully made up, the sealing surfaces are at the same angle and there is a minute thin film of lubricant therebetween. Thus, the sealing surfaces have not been subjected to the brunt or the harsh treatment of connection makeup and destruction of seal integrity is avoided.

High pressured connections subject both the box member and the pin member to radial or bearing stresses. It is possible to load higher grade (i.e., higher yield strength) material connections to greater stress levels of course, than lesser grade material connections, and thus provide a certainty that the seal will withstand the pressured operating environment to which the connection is subjected. In the prior art, the box member and pin member are customized to exactly cope with the conditions expected. Included in the customizing of the connection are the length of the sealing surface and the exact location thereof with respect to the distal end of the pin member. It has also been discovered, for example, that it is possible to locate the sealing surface of a pin member at a more remote location from the distal end thereof than was common practice before the discovery and effectively stiffen the pin member to withstand higher pressures without causing pressure leaking or material failure. This is described in co-pending U.S. patent application Ser. No. 937,750, commonly assigned with this application.

Therefore, in the prior art, once the bearing stresses and compression stresses were calculated or otherwise determined, then it was possible to select the grade material for the connecting members, the seal surface location and length of the seal surface to maximize the forces of the seal, while not over-stressing the members. Although certainly satisfactory, conditions of operations vary greatly. That is, the highest grade materials and the highest pressure seal is not required for every use application. As a result, it is common to have various grade tubular products available to select from for the needs at hand. Also, many tubular strings that are installed into oil and gas wells have a variety of material grades in their strings and thus the crossover connections from grade to grade is important. However, as explained, for one grade material connection, the sealing area length and location will ideally be different from that of another grade material connection. Therefore, to optimize the bearing contact stresses on the metal-to-metal seal while keeping all membrane sections of the connection from being subjected to yielding conditions each grade of materials in a mixed grade connection requires a specific seal surface length and radial interference to prevent yielding of the weakest connection. Attempting to place all connections of the same geometry and physical dimensions into a common assembly under maximum load conditions can result in damage to the weakest connection (i.e., the lowest material grade connection). Moreover, when desiring to progress through a transition of pipe grades from lesser to greater environmental pressure conditions mismatching must be recognized and coped with in a special manner, such as through a crossover connection or coupler. Such transition connection can also occur when lighter grade material pipe sections have all been used and the only available alternative is to go to a higher grade material pipe.

Therefore, it is a feature of the present invention to provide an improved method for assuring efficient tubular connections that maximize the sealing forces without overstressing the connecting members.

It is another feature of the present invention to provide an improved universal connection for multiple grades of tubular products, while assuring that the sizes of the sealing surfaces thereof are maximized and optimumly located for each grade or range of grades of material.

It is another feature of the present invention to provide an improved connection whereby various grades (i.e., material yield strengths) of connections have the same dimensional radial interference (as measured by the feature termed gage draw) and to control the connection stresses by means of the feature termed seal length on the metal-to-metal seals.

SUMMARY OF THE INVENTION

The invention pertains to a tubular connection comprising a box member and a pin member and having a metal-to-metal sealing surface therebetween on the forward end of the pin member. The box member and pin member are usually at the end of standard length of pipe or joint. However, the invention also applies to all box members and pin members wherever located, such as included in couplers and the like. To make the connection universal, the threads of all the members are made to match and all radial and other dimensions are made to match for all grades of material, with the exception of the seal area of the pin members, which differs from material grade to material grade, as more completely described below. The pin members made of a material in the medium grade within the range of expected connection materials for the tubular members, are designed to have a conically tapered seal surface area at a small longitudinal angle, and a conically tapered contacting surface area ahead of the seal area on the forward end of the pin member. The seal area has a longitudinal length that allows the bearing stresses in both members and the compression hoop stresses in the pin member to be less than the yield stress for the members, but large enough to maintain sealing of the connection with respect to the expected pressures. The longitudinal length of the contacting area is made about equal to that of the seal area.

The seal area of all box members are all at the same angle and the seal area is located so that it first contacts the contacting area of the seal area of the box member just described. Thereafter, as the connection is madeup, it matches in angle and uniformly perpendicularly or normally pressures against the seal area of the pin member. Some expansion of the box member and some compression of the pin member occurs to accomplish this desired result. All box members, regardless of material yield strength, are made with seal surface areas of the same angle and the same seal length to each other to accomplish the above results, whereas the pin seal length is varied in a relationship such that low grade materials have shorter seal length which are located distally from the end of the pin as compared to higher grades of materials whose pin seal length is longer and nearer the end of the pin.

The pin members of a material grade at the upper end of the grade range of expected connection materials are designed to have a seal surface area roughly in the same location as the seal surface area for the medium grade material pin member, except it is a larger area in that its length extends forward when compared to a medium grade pin member. For the overall longitudinal dimension of seal surface and contacting surface areas, the length of the seal surface area is made to be approximately 75% of the overall length of the seal area plus the contacting area. Thus, more area is provided to carry the bearing and compressive load stresses and also the effective center of the stresses are moved toward the distal end of the pin member with respect to the forces of the medium grade pin member.

In similar fashion, the pin members made of a material grade at the lower end of the grade range of expected connection materials are designed to have a seal surface area roughly in the same location as the seal surface area for the medium grade material pin member, except it is foreshortened or reduced with respect thereto, thereby causing a reduction of the amount of contacting surface area. For the overall longitudinal dimension of seal surface and contacting surface areas, the length of the seal surface area is made to be approximately 25% of the overall length. This provides less area for carrying the bearing and compressive loads (since the lesser grade material members are designed to carry less load) and also moves the effective center of the stresses away from the distal end of the pin member, thereby desirably effectively increasing the stiffness of the pin member.

By this procedure, box members and pin members of any grade material compatibly fit with another and the seal area and radial stresses are optimized in accordance with the parameters of the pin member grade material to prevent yielding of the thin pin end sections. These relationships are possible because the contact bearing stresses on the metal-to-metal seals are by necessity much higher than the fluid or gas pressures to be sealed. The seal bearing stresses can safely be placed in a range suitable for sealing purposes and suitable for the allowed material compressive stresses and suitable for preventing galling of the sealing surfaces without causing yielding of the thin pin sections of the seal.

The contacting surface can be either contiguous with the sealing surface, but at a slightly greater or steeper angle, or it can be stepped to a smaller diameter at approximately the same or perhaps at a slightly steeper taper than the sealing surface area.

By this procedures, seal contact stresses can be increased for improved sealing integrity without increasing the stock keeping units of inventory so that all grades of material can be safely intermingled for the required application in oil and gas wells by the end user.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the drawings.

DESCRIPTION OF THE PREFERRED EMBODIMENTS

Figure 1:
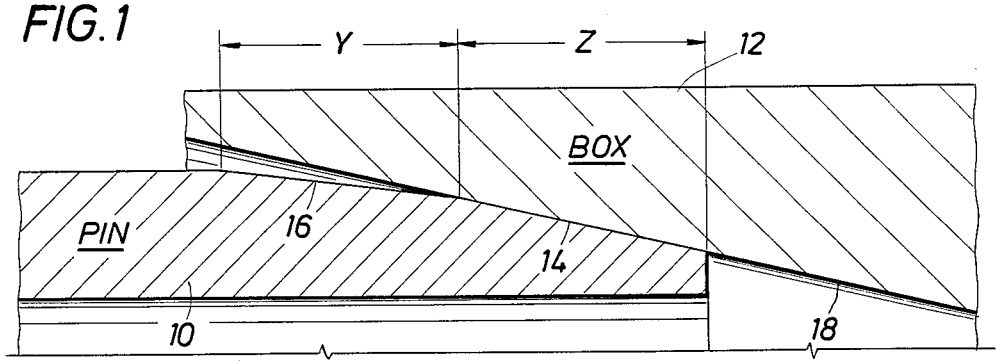
FIG. 1 is a longitudinal profile of a conical sealing area and the adjacent contacting surface area of a medium grade tubular connection in accordance with a first embodiment of the present invention as the box member and pin member are brought into initial contact during makeup.

Now referring to the drawings, and first to FIG. 1, a profile of the metal-to-metal sealing end of pin member 10 and the matching surface of a related box member 12 is shown for a typical tubular connection employed in down hole oil and gas applications. The profile is in schematic form and does not show all of the intricacies involved in the members of an actual connection, such as rounded or beveled edges at the distal end of the pin member. However, the profile does disclose a conically tapered contacting area 14 close to or adjacent pin member distal end 15. In the embodiment shown, the angle of surface area 14 with respect to the longitudinal axis of the connection is approximately equal to 5°.

Adjacent contacting area 14, and away from distal end 15, is seal surface area 16, which is also a conically tapered surface, but at a smaller longitudinal angle. The angle shown is approximately equal to 3°, although this angle can be as large as 15°. The requirements, as more specifically set forth with respect to FIG. 5, typically call for the contacting surface to be at a longitudinal angle of approximately one-half to five degrees greater than the sealing surface. For convenience, the longitudinal length of sealing surface area 16 is designated "Y" and the longitudinal length of contacting surface area 14 is designated "Z".

The box member has a corresponding conically tapered surface area 18, which when the connection is fully made up is at the same angle as sealing surface 16 of the pin member. The sealing surface of the pin member and the portion of surface area 18 of the box member that makes contact therewith constitutes the sealing surface areas that makes metal-to-metal sealing contact in accordance with principles well known in the art.

Figure 2:
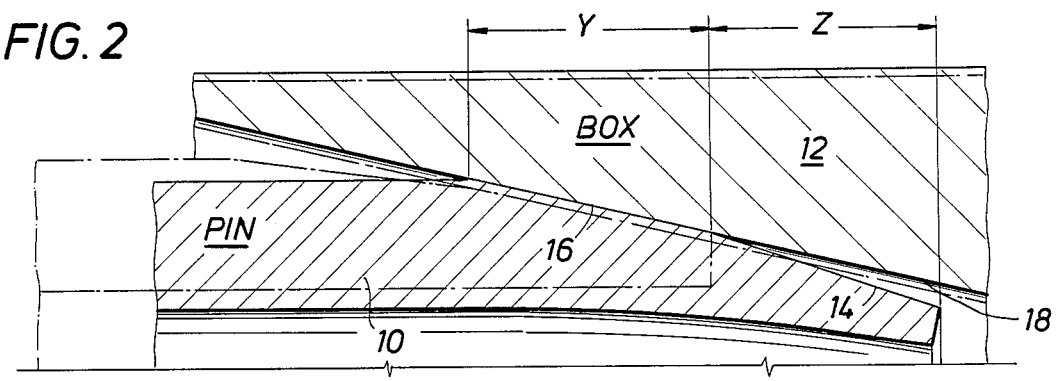
FIG. 2 is a longitudinal profile of the tubular connection shown in FIG. 1 after the connection is completely made up and the pin member has been forced into the box member.

In brief summary of what occurs during physical makeup, when pin member 10 and box member 12 first come together, pin member surface area 14 contacts box member surface area 18 and causes a slight compression of the pin member and a slight expansion of the box member. As the connection is progressively rotationally and slidably tightened the entire surface area 16 is loaded by a surface area of area 18 that bears against it. At full makeup, the connection surfaces appear as shown in FIG. 2. The dotted lines represent the conditions that existed as shown in FIG. 1 prior to makeup. The solid lines represent an exaggeration as to the conditions of the members at full make up. It will be seen that the pin member is compressed somewhat more than the box member is expanded. Stress on the pin member is a function of the absolute inward force applied thereto and the area over which it is applied. For FIG. 2 the area entering into the calculation is seal area 16. It may be further seen that this seal area 16 has a longitudinal length Y that is roughly equal to the longitudinal length of contacting area Z. It should be further noted that although area 14 is referred to as the "contacting" area, the box member surface or edge that comes into contact with surface 14 will not necessarily contact all of area 14. Thus, "contacting" area as used herein includes not only the area that is actually contacted during makeup, but also includes the entire area forward of the seal area on the pin member. Hence, in FIGS. 1 and 2, longitudinal length Z is approximately equal to longitudinal length Y, each being approximately 50% of their combined length.

Figure 3:
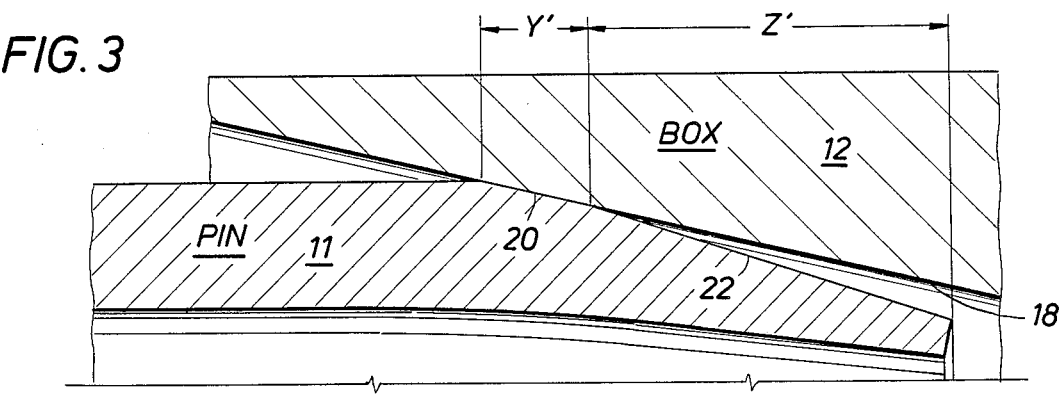
FIG. 3 is a longitudinal profile of a conical sealing area and the adjacent contacting surface area of a lower grade tubular connection in accordance with a first embodiment of the present invention.

Stress can be reduced on the pin member by proportionally reducing length Y to Z, or by absolutely reducing the area represented by length Y. Thus, for the lowest grade material for the range of materials used for pin members, seal surface area 20 shown in FIG. 3 for lower grade pin member 11 has a longitudinal length Y', that is much less than length Y. Adjacent contacting area 22, on the other hand, has a length Z' that is much longer than length Z. However, the taper angle of these respective seal and contacting surfaces are respectively the same as for their counterparts for the medium grade pin member shown in FIGS. 1 and 2. Moreover, operation is the same as that described for making the connection of FIGS. 1 and 2; however, the pin member is stressed less. The size of the area has been described above as being less, but it should also be noted that its location is now further from the distal end of pin member 11 than the location of area 16 in FIG. 2. Thus, the pin member is stiffened, further optimizing the design of the low grade pin members.

Figure 4:
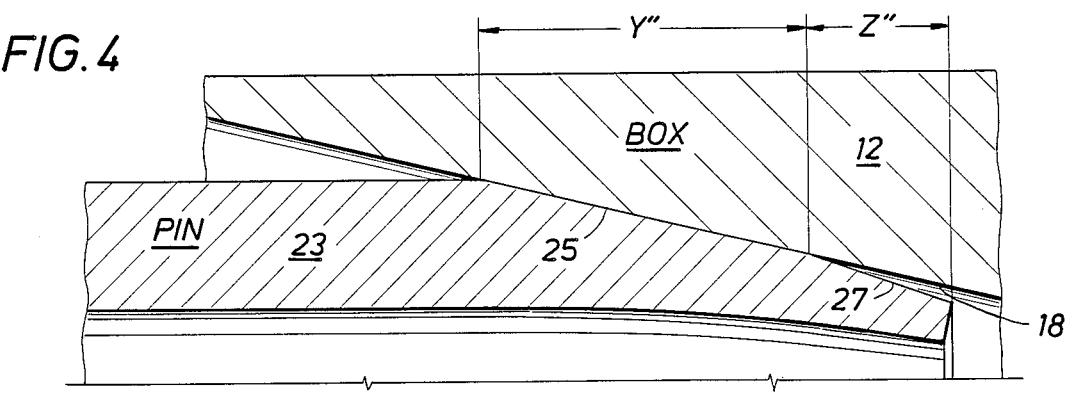
FIG. 4 is a longitudinal profile of a conical sealing area and the adjacent contacting surface area of a higher grade tubular connection in accordance with a first embodiment of the present invention.

FIG. 4 illustrates the design of the seal surface and contacting surface for the highest grade pin member 23 in the range. Here the longitudinal length Y" of seal surface 25 is longer than the longitudinal length Y of seal surface 16 in FIGS. 1 and 2 and the longitudinal length Z" of contacting surface 27 is shorter than the longitudinal length Z of contacting surface 14. Again, the angles of the respective conically tapered surfaces are the same as for their counterparts. However, because Y" is larger than Z", the compressive force on the pin member is larger than for the pin member illustrated in FIG. 1.

For typical grade materials of pin members used in premium grade tubular products, medium grade of material can be of 80,000 psi yield. For such grade material lengths Y and Z should be approximately equal. For materials of 55,000 psi yield (a typical grade at the lowest range of acceptably hard materials), lengths Y' and Z' should be such that Y' is approximately 25% of the total length and Z' is approximately 75%. Finally, for materials of 150,000 psi yield (a typical grade at the highest range of acceptable materials), lengths Y" and Z" should be such that Y" is approximately 75% of the total length and Z" is approximately 25%. The grades of material mentioned above are representative, but actual conditions can dictate grades that vary considerably from the above examples.

The geometry of the box member is the same for all grades of materials in the range and is deigned not to gall or yield or cause galling or yielding when used in any configuration. The combination that exerts the most bearing stress on the box member is when a box member of any grade is used with the highest grade of pin member. In all cases, the pin member design is the critical designed component of the connection.

Although not described in detail above, the surfaces of the contacting areas will be rougher finish than for the respective seal areas and an appropriate lubricating compound will be applied thereto. As the connection is tightened, the lubricating compound is distributed over the sealing surface in a thin film to further protect the connection against galling.

Figure 5:
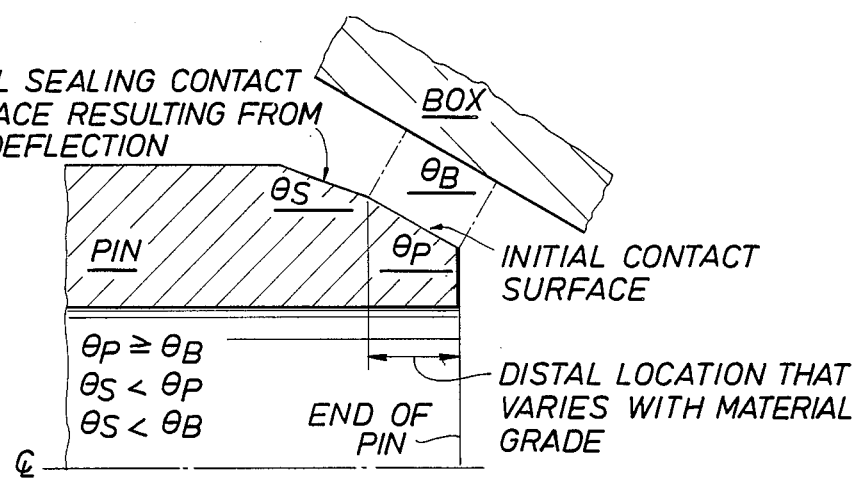
FIG. 5 is a diagram of the relative angle relationships of the sealing and contacting surfaces of the embodiments shown in FIGS. 1–4.

Referring to FIG. 5, the relative angle relationships of the embodiments disclosed in FIGS. 1-4 are shown. The angle of the sealing surface of the box member is $\theta_B$, the angle of the contacting surface of the pin member is $\theta_p$ and the angle of the sealing surface of the pin member is $\theta_S$. More specifically, the $\theta_p$ angle is the angle of the contacting surface of the pin member at initial contact and prior to member deflection. The $\theta_S$ angle is the final sealing contact surface of the pin member resulting from pin deflection. The relationships of these angles in accordance with the present invention as represented by the embodiments of FIGS. 1-4 are as follows: $\theta_p \geqq \theta_B$; $\theta_S < \theta_p$.

Figure 6:
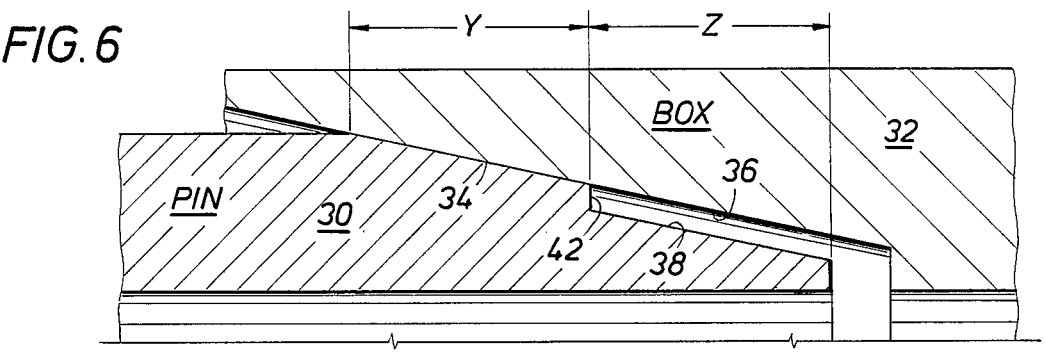
FIG. 6 is a longitudinal profile of a conical sealing area and the adjacent contacting surface area of a medium grade tubular connection in accordance with a second embodiment of the present invention.
Figure 7:
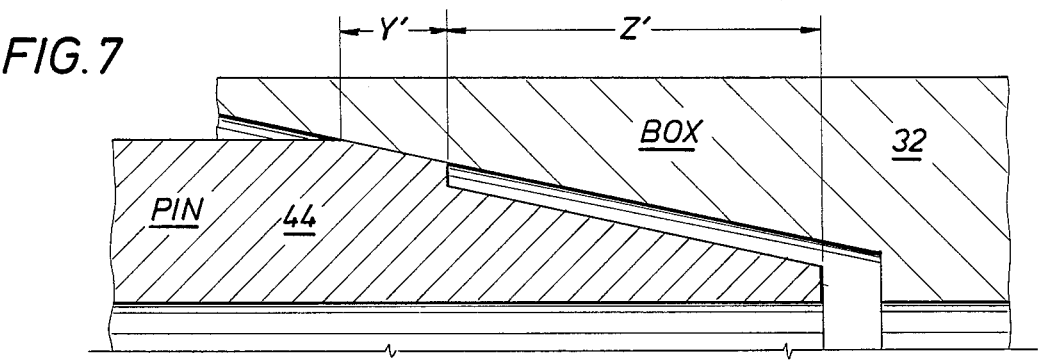
FIG. 7 is a longitudinal profile of a conical sealing area and the adjacent contacting surface area of a lower grade tubular connection in accordance with a second embodiment of the present invention.
Figure 8:
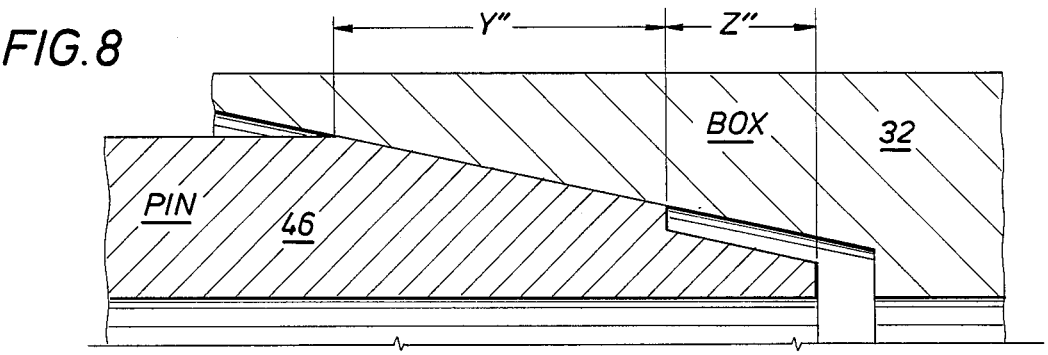
FIG. 8 is a longitudinal profile of a conical sealing area and the adjacent contacting surface area of a higher grade tubular connection in accordance with a second embodiment of the present invention.

Now referring to FIGS. 6-8, an alternate preferred embodiment of the connection is illustrated. FIG. 6 illustrates a pin member of medium grade material, such as 80,000 psi yield; FIG. 7 illustrates a pin member of the lowest grade material for the range of materials in use, such as 55,000 psi yield; and FIG. 8 illustrates a pin member of the highest grade material for the range of materials being employed, for example, 150,000 psi yield. Again, these grades are mentioned by way of example only, and not by way of limitation.

Pin member 30 and box member 32 fit together so that the sealing area 34 on the pin member engages in a metal-to-metal seal with sealing area 36 on the box member. Area 38 is in clearance with sealing area 36, thus end area 38 acts as a stiffner to the pin end. As with the first embodiment, all of these areas are located ahead of the first thread (not shown) on the pin member. Unlike the earlier described embodiments of FIGS. 1-4, the area in front of the sealing area is not a contacting area. In physical appearance, the primary difference between this embodiment and the embodiment of the invention disclosed in FIGS. 1-4 is that there is a step 42 between the seal surface area and the adjacent surface area, the surface area being at a reduced diameter of conical taper at the bottom of the step. Also, the angle of the taper of the surface 38 can be very close to the same as the angle of the seal surface. For example, the longitudinal conical taper of area 34 is typically about 3° and the conical taper of area 38 is typically about the same or possible only slightly greater. The step provides a manufacturing advantage in that the areas before and after the step are each readily measurable, rather than gradually progressing from one to the other.

When the box member and pin member come together preliminary to making the connection, the surfaces that come into contact are only lightly in contact. There is lubricating compound on the surface 38 that is squeezed forward and over the step as the connection is tightened to lubricate and protect the sealing surfaces. When the connection is completely tightened, all of the sealing surface 34 is in press hard contact with a portion of box member sealing surface 36. The load conditions are the same as for the first embodiment.

Again, as with the first embodiment, the box member configuration is the same for all grades of material within the range. However, the pin members are not the same. FIG. 6 illustrates that longitudinal lengths Y and Z are approximately equal for the medium grade. For the lower grade material, length Y' shown in FIG. 7 is about 25% of the total length of sealing and contacting areas and Z' is about 75%. For the highest grade material, length Y" shown in FIG. 8 is about 75% of the total length and Z" is about 25%.

In essence for both embodiments, a "wider" seal contact surface is provided for the higher grade materials. The width of the seal contact surface not only decreases for the lower grade materials, such contact surfaces are also physically located further from the distal end of the pin member. As a result, the pin member is also made stiffer for the narrower seals on the lower grades and, therefore, is more resistant to sectional yielding. Connection compatibility is maintained by using the same level of radial interference at the seal for all grades of a given size and weight of tubular products.

While particular embodiments of the invention have been shown and described, it will be understood that the invention is not limited thereto, since modifications may be made and will become apparent to those skilled in the art.

What is claimed is:

1. The method of preparing metal-to-metal sealing surfaces for sealing tubular members in universal connection makeup regardless of material yield strength of the tubular members, which comprises preparing all connecting box members regardless of the material yield strength with a seal surface at a universal conical taper angle, and preparing respective pin members with an initial conical seal contact surface having a taper angle approximately equal to the universal seal surface conical taper angle of said box members and having a final sealing conical contacting surface at a lesser angle than said angle of said contact seal surface and located toward the distal end of the respective pin members from said conical seal surface, the longitudinal length of said seal surface and said contacting surface being approximately equal for medium yield strength material pin members, the longitudinal length of said seal surface being greater than the longitudinal length of said contacting surface for higher yield strength pin members, and the longitudinal length of said seal surface being less than the longitudinal length of said contacting surface for lower yield strength material pin members, whereby bearing pressure on both members and resulting compression hoop stresses in the pin member of a connection are greatest for the highest yield strength material pin member and are the least and located the furtherest from the distal end for the lowest yield strength material pin member.

2. The method of preparing surfaces for sealing tubular members in accordance with claim 1, wherein the respective universal seal surfaces on said pin members are contiguous with the respective greater angle contacting surfaces.

3. The method of preparing surfaces for sealing tubular members in accordance with claim 2, wherein said universal seal surfaces are at a longitudinal angle of approximately three to fifteen degrees.

4. The method of preparing surfaces for sealing tubular members in accordance with claim 3, wherein said contacting surfaces are at a longitudinal angle of approximately one-half to five degrees greater than the sealing surfaces.

5. The method of preparing surfaces for sealing tubular members in accordance with claim 1, wherein the longitudinal length of said seal surface and said contacting surface are approximately equal for pin members having a 80,000 psi yield strength; the ratio of the longitudinal lengths of said seal surface to contacting surface is approximately ⅓ for pin members having a 55,000 psi yield strength; and the ratio of the longitudinal lengths of said seal surface to contacting surface is approximately 3/1 for pin members having a 150,000 psi yield strength.

6. The method of preparing surfaces for sealing tubular members in accordance with claim 1, and including a radial step between the respective universal seal surfaces on said pin members and the respective greater angle contacting surfaces.

7. The method of preparing surfaces for sealing tubular members in accordance with claim 6, wherein said universal seal surfaces are at a longitudinal angle of approximately three to fifteen degrees and said contacting surfaces are at a longitudinal angle equal to or greater than the longitudinal angle of said universal seal surfaces.

* * * * *